United States Patent
Zheng et al.

(10) Patent No.: US 8,984,740 B1
(45) Date of Patent: Mar. 24, 2015

(54) PROCESS FOR PROVIDING A MAGNETIC RECORDING TRANSDUCER HAVING A SMOOTH MAGNETIC SEED LAYER

(71) Applicant: Western Digital (Fremont), LLC, Fremont, CA (US)

(72) Inventors: Yuankai Zheng, Fremont, CA (US); Qunwen Leng, Palo Alto, CA (US); Cheng-Han Yang, Mountain View, CA (US); Zhitao Diao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 190 days.

(21) Appl. No.: 13/691,712

(22) Filed: Nov. 30, 2012

(51) Int. Cl.
G11B 5/127 (2006.01)
H04R 31/00 (2006.01)
G11B 5/31 (2006.01)

(52) U.S. Cl.
CPC ................................ G11B 5/3163 (2013.01)
USPC .................. 29/603.14; 29/603.13; 29/603.15; 29/603.16; 29/603.18; 360/121; 360/122; 360/317

(58) Field of Classification Search
USPC ............... 29/603.08, 603.12, 603.15, 603.16, 29/603.18, 606; 216/62, 65, 66; 360/121, 360/122, 317
See application file for complete search history.

(56) References Cited

U.S. PATENT DOCUMENTS

| | | |
|---|---|---|
| 4,755,898 A * | 7/1988 | Higashionji et al. ..... 360/119.07 |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |

(Continued)

*Primary Examiner* — Paul D Kim (57) ABSTRACT

A method for providing a magnetic recording transducer is provided. The method includes providing a substrate, and a magnetic shield having a top surface above the substrate. The top surface is treated by a first plasma treatment performed at a first power. An amorphous ferromagnetic (FM) layer is deposited on and in contact with the top surface to a thickness of at least 5 Angstroms and not more than 50 Angstroms. A second plasma treatment is performed at a second power. A magnetic seed layer is provided on and contact with the amorphous FM layer. The magnetic seed layer may comprise a bilayer. A nonmagnetic spacer layer is provided above the magnetic seed layer, an antiferromagnetic (AFM) layer provided above the spacer layer, and a read sensor provided above the AFM layer.

10 Claims, 4 Drawing Sheets

(56) References Cited

U.S. PATENT DOCUMENTS

| | | | |
|---|---|---|---|
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |

(56) References Cited

U.S. PATENT DOCUMENTS

| | | |
|---|---|---|
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,377,025 B2 | 5/2008 | Zhao et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |

(56) References Cited

U.S. PATENT DOCUMENTS

| | | |
|---|---|---|
| 7,650,684 B2 | 1/2010 | Lee et al. |
| 7,660,080 B1 | 2/2010 | Liu et al. |
| 7,672,080 B1 | 3/2010 | Tang et al. |
| 7,672,086 B1 | 3/2010 | Jiang |
| 7,672,089 B2 | 3/2010 | Lin |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,950,136 B2 | 5/2011 | Zhao et al. |
| 7,968,219 B1 | 6/2011 | Jiang et al. |
| 7,982,989 B1 | 7/2011 | Shi et al. |
| 7,983,011 B2 | 7/2011 | Zhao et al. |
| 8,008,740 B2 | 8/2011 | Zhao et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,081,405 B2 | 12/2011 | Lin |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |

(56) References Cited

U.S. PATENT DOCUMENTS

| | | | |
|---|---|---|---|
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2003/0072109 A1* | 4/2003 | Sharma et al. ............. 360/324.2 |
| 2006/0092578 A1 | 5/2006 | Zhao et al. |
| 2008/0268293 A1* | 10/2008 | Ajan ........................ 428/831.1 |
| 2010/0290157 A1 | 11/2010 | Zhang et al. |
| 2011/0086240 A1 | 4/2011 | Xiang et al. |
| 2011/0086439 A1 | 4/2011 | Choi |
| 2012/0111826 A1 | 5/2012 | Chen et al. |
| 2012/0164485 A1 | 6/2012 | Lin |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

PROCESS FOR PROVIDING A MAGNETIC RECORDING TRANSDUCER HAVING A SMOOTH MAGNETIC SEED LAYER

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

Figure 1:
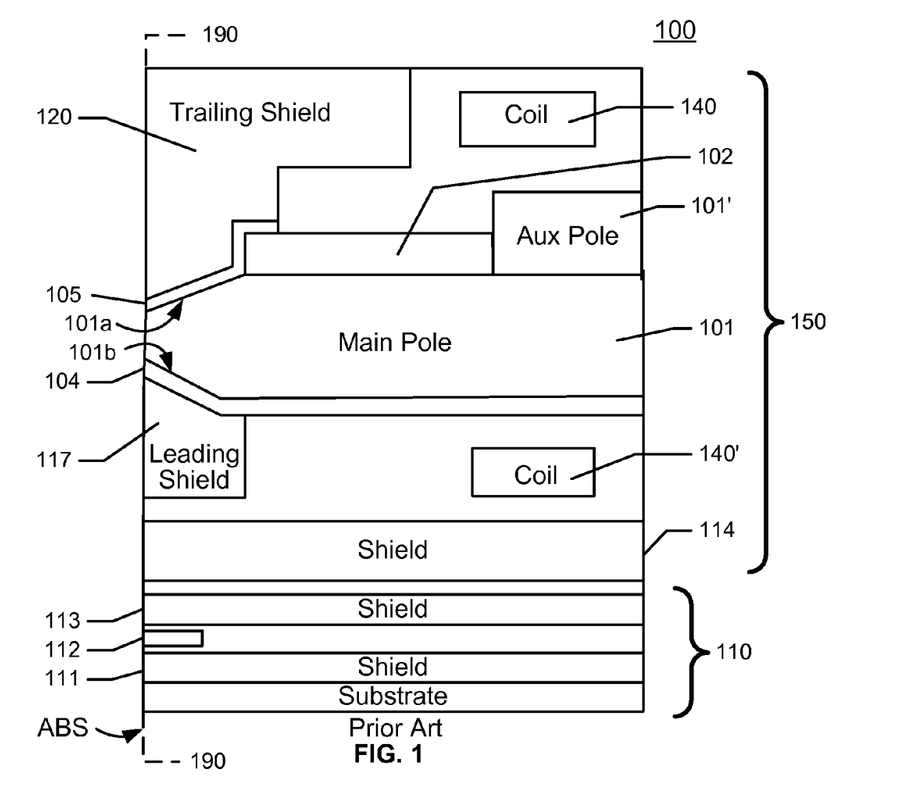
FIG. 1 illustrates a side section view of a portion of a read-write recording head.

FIG. 1 illustrates a side section view of read/write head 100 incorporating a write transducer 150 and read transducer 110, both facing the ABS 190. The read transducer 110 may include shield 111 and shield 113 as well as read sensor 112. Write transducer 150 includes shield 114, main pole 101, assist pole (or auxiliary pole) 101', coil 140 and coil 140', leading shield 117 and trailing shield 120. Side shields are not shown in this sectional view, however may reside on the sides of main pole 101. Main pole 101 has trailing bevel 101a and a leading bevel 101b. A leading nonmagnetic gap layer 104 separates main pole 101 from underlying structures, and trailing nonmagnetic gap layer 105 separates main pole 101 from structures above. A nonmagnetic spacer layer 102 is illustrated on the non-beveled section of main pole 101; however, in other embodiments may be provided above main pole 101 beginning at any point distal from the ABS 190, including on bevel 101a.

Figure 2:
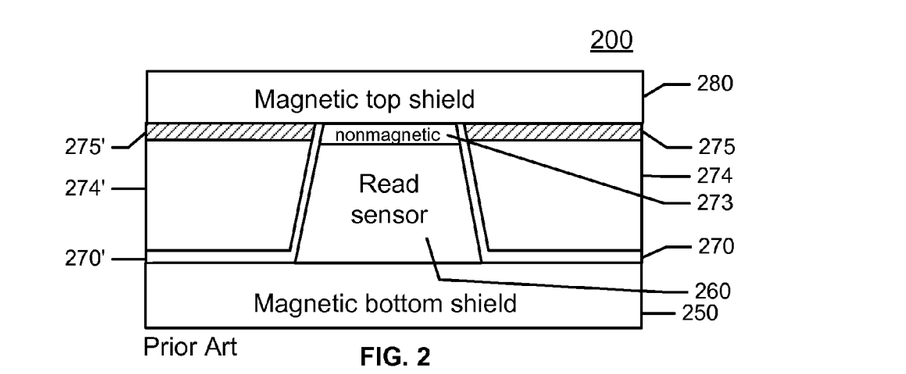
FIG. 2 illustrates an ABS section view of a read transducer portion of a recording head.

FIG. 2 illustrates an ABS view of a read transducer section 200 analogous to read sensor 110 described in FIG. 1. A read sensor 260 is positioned between magnetic bottom shield 250 and magnetic top shield 280 and between side shield 274 and 274'. In one embodiment, nonmagnetic layers 275 and 275' may be applied above side shields 274 and 274' respectively. The addition of nonmagnetic layers 275 and 275' may be desirable to separate a side shield comprising a hard bias from a soft magnetic material in magnetic top shield 280 above. A nonmagnetic gap layer 273 is analogous to nonmagnetic gap layer 105 in FIG. 1.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention.

Figure 3:
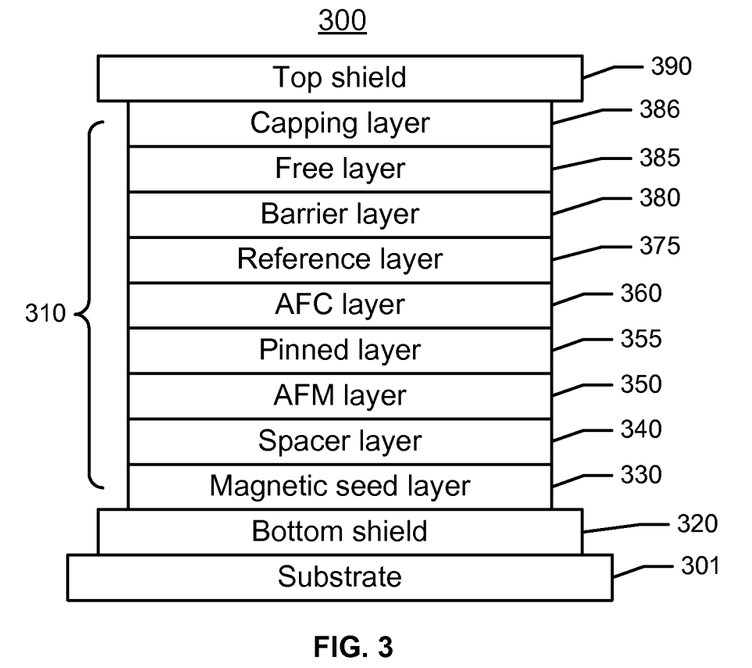
FIG. 3 illustrates a view of a read transducer comprising multiple layers positioned between shields in accordance with one embodiment of the invention.

FIG. 3 illustrates a view of a read transducer 300 comprising multiple layers positioned between shields, and is an embodiment analogous to one described generally in FIG. 2; however, the side structures are not depicted. A bottom shield 320 resides on a substrate 301. The substrate 301 may be any suitable underlayer and may include, for example, alumina (ALOx). A read sensor 310 resides above bottom shield 320. Bottom shield 320 may comprise soft magnetic material. A top shield 390 resides above and magnetically shields the read sensor 310. Top shield 390 may comprise soft magnetic material and in one embodiment comprises the same soft magnetic material as in bottom shield 320.

In one embodiment of the invention, read sensor 310 comprises magnetic seed layer(s) 330, spacer layer 340, AFM layer 350, pinned layer 355, and AFM coupling (AFC) layer 360. In one embodiment of the invention, AFM Layer 350 may comprise one of IrMn, RhMn, RuMn, or FeMn; and in another embodiment may comprise one of PdMn, NiMn, or PtMn if a higher blocking temperature is desired. Spacer layer 340 functions to magnetically separate the magnetic seed layer(s) 330 from AFM layer 350, so the magnetic seed layer 330 won't be pinned by AFM layer 350. In an embodiment of the invention, the magnetic seed layer 330 comprises a bilayer. In one embodiment of the invention, spacer layer 340 may comprise, for example, Ru, Ti, or Ta, or their combinations.

Pinned layer 355 is above AFM layer 350 and may comprise, for example, CoFe or CoFeB. The AFM layer 350 stabilizes the pinned layer 355. The magnetization (not shown) of pinned layer 355 is substantially fixed, or pinned. The magnetization is fixed by annealing the read sensor 310, or a portion thereof, in an oriented magnetic field at an annealing temperature. AFC layer 360 is above pinned layer 355 and provides anti-parallel alignment from the pinned layer 355 to reference layer 375 above, and may comprise, for example, Ru.

A barrier layer 380 is above reference layer 375 and a free layer 385 above barrier layer 380. A capping layer 386 is above free layer 385. The read sensor 310 has a resistance that varies in response to the relative magnetic orientations of the reference layer 375 below the barrier layer 380, and the free layer 385 above the barrier layer 380. The orientation of free layer 385 may move, or switch, in response to an external field such as that from a magnetic recording medium. A sense current may be passed between bottom shield 320 and top shield 390; and as the magnetic field emanating from the recording medium passes the free layer 385, the resistance changes, thereby affecting the sense current, which may be used to provide an electrical signal. This configuration is referred to as current perpendicular to plane (CPP), although other configurations known in the art such as current in plane (CIP) may also be used. Other and/or different components may be fabricated in other embodiments. For example, in some embodiments, coupling enhancing layers, stop layers and/or seed layers may also remain between layers as part of the fabrication process.

Figure 4:
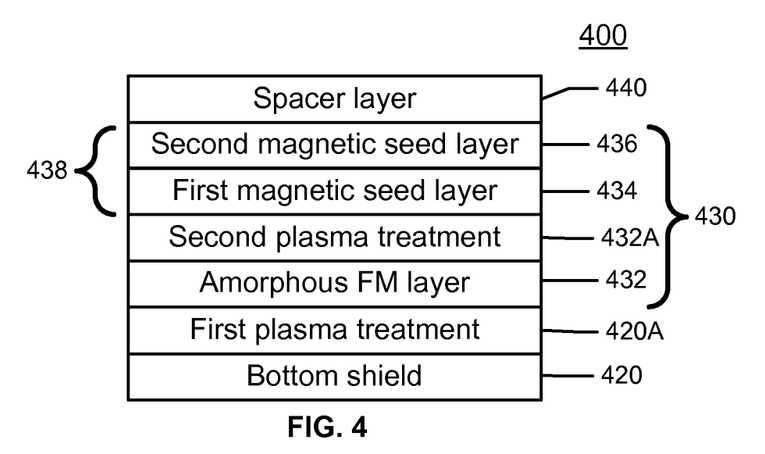
FIG. 4 illustrates a fabrication detail of a bottom portion of a read transducer in accordance with one embodiment of the invention.

FIG. 4 illustrates a fabrication detail of a bottom portion 400 of a read transducer in accordance with one embodiment of the invention. In FIG. 4, bottom shield 420 is analogous to bottom shield 320 in FIG. 3, magnetic seed layer 430 is analogous to magnetic seed layer 330 in FIG. 3, and spacer layer 440 is analogous to spacer layer 340 in FIG. 3. Magnetic seed layer 430 also includes an amorphous FM layer 432 on top of magnetic shield 420.

Also shown in FIG. 4 is a plasma treatment 420A that is performed after the chemical mechanical polishing (CMP) of the bottom shield 420. CMP provides a smooth surface and may leave a surface roughness $R_{a(1)}$ from about 0.2 nm to about 0.4 nm. Unfortunately, after the CMP process, oxidation residue may form on the surface that may interfere, or cause a boundary with a magnetic seed layer formation to be applied over the bottom shield 420. In order to eliminate this residue, the bottom shield 420 is treated with a first plasma treatment 420A prior to deposition of additional layers. The bottom shield 420 is exposed to gaseous plasma at a first power from approximately 30 Watts to approximately 100 Watts. In one embodiment of the invention, the first plasma treatment is performed using physical vapor deposition (PVD) technology and for a duration sufficient to remove CMP residue and expose the underlying bottom shield 420. One consequence of the first plasma treatment is that the plasma treatment will affect the smooth crystalline surface of shield 420 and leave a roughened surface. For example, the surface roughness $R_{a(2)}$ may be increased, and may be above about 0.4 nm after the plasma cleaning treatment.

In one embodiment of the invention, an amorphous FM layer 432 is applied directly on and in contact with the plasma treated bottom shield 420. In one embodiment, the amorphous FM layer 432 comprises at least one of CoFeB, NiCoFeB, and NiFeB, wherein B comprises from about 18 atomic percent (at. %) to about 22 at. %. In one embodiment, the amorphous ferromagnetic (FM) layer 432 is deposited on and in contact with the bottom shield 420; and the amorphous FM layer 432 deposited to a first thickness of at least 5 Angstroms and not more than 50 Angstroms; and in one embodiment, the amorphous FM layer 432 is deposited to a first thickness of about 20 Angstroms. Because the amorphous FM layer 432 is amorphous, it has the effect of providing a surface that can be smoothened significantly by appropriate plasma treatment, thereby smoothing the roughened surface of bottom shield 420, and providing an improved surface for layers to be applied above.

Amorphous FM layer 432 was deposited to a first thickness greater than a final thickness to allow for a second plasma treatment 432A that provides both smoothing and thinning of amorphous FM layer 432. In one embodiment of the invention, the second plasma treatment 432A is performed at a second power that may be from approximately 30 Watts to approximately 50 Watts. In another embodiment, the second plasma treatment reduces the thickness of the amorphous FM layer 432 to a final thickness of at least 5 Angstroms and not more than 20 Angstroms.

After the second plasma treatment 432A, the bilayer magnetic seed layer 438 is deposited on the plasma treated amorphous FM layer 432. In one embodiment of the invention, the magnetic seed layer 438 is a bilayer including a first magnetic seed layer 434, the first magnetic seed layer on and in contact with the amorphous FM layer 432, and a second magnetic seed layer 436 that is on and in contact with the first magnetic seed layer 434, wherein the first magnetic seed layer 434 comprises $Ni_{1-x}Fe_x$, where x is at least 0.45 and not more than 0.55 and the second magnetic seed layer 436 comprises $Ni_{1-y}Fe_y$, where y is at least 0.05 and not more than 0.15.

Use of the bilayer magnetic seed layer 438 may improve performance of the read sensor 310 and thus the read transducer 300. The first magnetic seed layer 434 has a higher concentration of Fe. The higher concentration of Fe results in a higher thermal stability in the read sensor 310. As a result, the stability of the read sensor 310 may be improved. The second magnetic seed layer 436 has a lower concentration of Fe than the first magnetic seed layer 436. The second magnetic seed layer 436 thus has a lower magnetic moment than the first magnetic seed layer 434. As a result, issues due to a high moment of the magnetic seed layer 438 such as issues due to over-milling may be reduced. In addition, the second magnetic seed layer 436 may have magnetostriction opposite to that of the first magnetic seed layer 434. For example, the second magnetic seed layer 436 layer may have negative magnetostriction, while the first magnetic seed layer has a positive magnetostriction. The total magnetostriction of the bilayer magnetic seed layer 438 may thus be reduced or brought to zero by balancing the magnetostriction. Thus, the bilayer magnetic seed layer 438 may be less likely to induce unwanted anisotropies, improving the stability of the shield 420. Consequently, performance of the read transducer 300 may be improved.

Spacer layer 440 may comprise nonmagnetic material; and may comprise at least one of Ru, Ti, and Ta. In some embodiments, the spacer layer 440 may be used to break or reduce the magnetic coupling between the bilayer magnetic seed layer 438 and the AFM layer 350. In one embodiment, the nonmagnetic spacer layer 440 is deposited to a final thickness of at least 2.0 Angstroms and not more than 4.0 Angstroms prior to depositing the AFM layer 350. The nonmagnetic spacer layer cannot exceed a maximum thickness otherwise the magnetic exchange field ($H_{ex}$) will decrease and the sensor may become unstable. The present invention improves $H_{ex}$ by improving the crystalline structure and thereby improves stability of the AFM layer 350. This, in turn, allows for greater thickness range in the thickness of the spacer layer 440, and further resulting in an improved magnetic resistance ratio (MR) and higher sensor performance.

Figure 5:
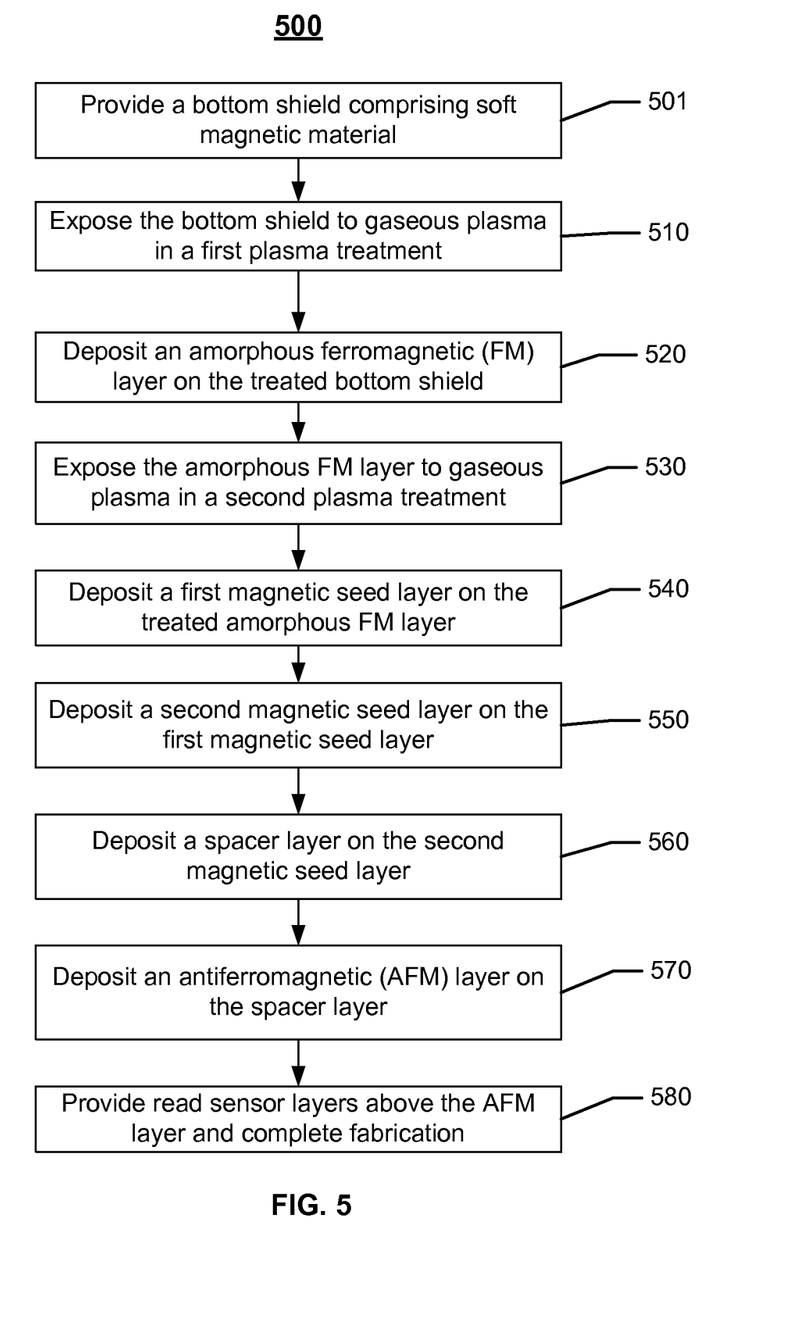
FIG. 5 illustrates a process for fabricating a recording transducer in accordance with one embodiment of the invention.

FIG. 5 illustrates a process 500 for fabricating a magnetic recording transducer having a smooth magnetic seed layer.

Beginning in block 501, a bottom shield comprising soft magnetic material is provided. Typically, the bottom shield comprises NiFe, and is provided on a substrate which may comprise AlTiC. The bottom shield undergoes patterning and planarization, typically CMP, in preparation for subsequent operations to deposit a read sensor above the bottom shield.

In block 510, the bottom shield is exposed to gaseous plasma in a first plasma treatment. The first plasma treatment is a cleaning operation performed prior to deposition of additional layers. The bottom shield may be exposed to gaseous plasma in a first plasma treatment process at a first power from approximately 30 Watts to approximately 100 Watts until residue and oxidation are substantially removed from the bottom shield.

In block 520, an amorphous FM layer is deposited on the plasma treated bottom shield. The amorphous FM layer may be deposited to a thickness greater than a final desired thickness. In one embodiment of the invention, the amorphous FM layer is deposited to a thickness of about 20 Angstroms.

In block 530, the amorphous FM layer is treated with low power gaseous plasma in a second plasma treatment operation. The second plasma treatment process may be at a power from approximately 30 Watts to approximately 50 Watts, and continues until a final target thickness is achieved. In one embodiment, the final target thickness of the amorphous FM layer may be about 10 Angstroms.

In block 540, a first magnetic seed layer is deposited on and in contact with the plasma treated amorphous FM layer.

In block 550, a second magnetic seed layer is deposited on the first magnetic seed layer.

In block 560, a nonmagnetic spacer layer is deposited above the second magnetic seed layer. In one embodiment, the nonmagnetic seed layer may comprise at least one of Ru, Ti, and Ta, and may have a final thickness of at least 2.0 Angstroms and not more than 4.0 Angstroms.

In block 570, an AFM layer is deposited on the nonmagnetic spacer layer.

In block 580, the remaining sensor layers are provided above the AFM layer.

Figure 6:
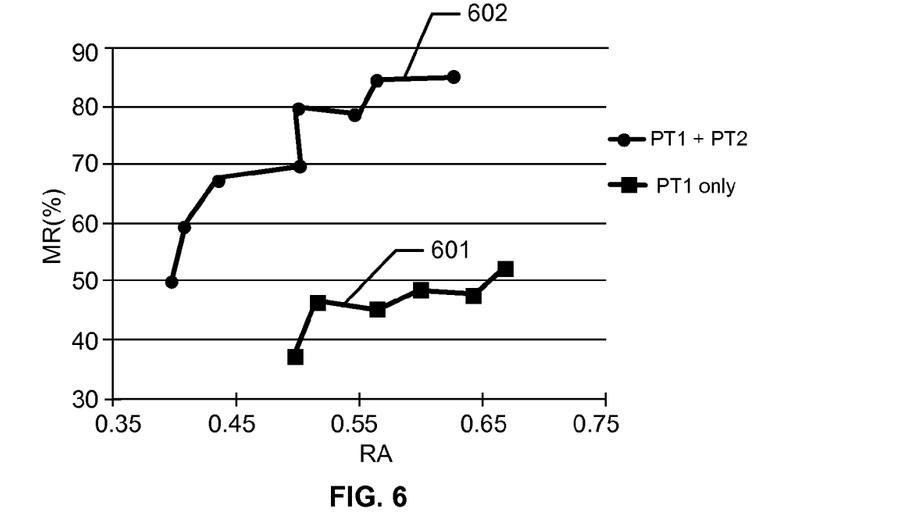
FIG. 6 is a graph showing performance characteristics of a recording transducer in accordance with one embodiment of the invention.

FIG. 6 is a chart that illustrates the performance of a read sensor fabricated according to embodiments of the invention. The y-axis in FIG. 6 is the magnetoresistance ratio measured in percent (MR %), computed as maximum magnetoresistance minus the minimum magnetoresistance, the difference divided by the minimum magnetoresistance, and the result multiplied by 100%. The x-axis of FIG. 6 is the resistance area (RA) measured in Ohms micron$^2$. It is generally desired to have a high MR % to provide a high signal to noise ratio (SNR).

The first response curve 601 represents the transfer function of a read sensor similar to that described in FIG. 3, and including a first plasma treatment on the bottom shield similar to that described in first plasma treatment 420A in FIG. 4; and also including an amorphous FM layer similar to the amorphous FM layer 432 in FIG. 4. Response curve 601 does not; however, include a second plasma treatment on the amorphous FM layer.

The second response curve 602 represents the transfer function of a read sensor according to one embodiment of the invention. Second response curve 602 illustrates the response of a read sensor similar to that described in FIG. 3 and FIG. 4, and including the first plasma treatment 420A and the second plasma treatment 432A and fabricated using process 500 as described in FIG. 5.

The response curve 601 demonstrates that as the read sensor RA is reduced below about 0.5, that the MR % is significantly degraded, limiting the amount the physical size of the read transducer can be reduced and still provide a high performance transducer. The response curve 602, however, illustrates a significantly higher MR %, and also high performance at a much smaller RA. This combination of higher MR % at even smaller RA enable the fabrication of smaller read transducers that are able to sense higher density magnetic patterns emanating from a recorded magnetic media, thereby increasing the achievable areal density of the magnetic storage device. Another favorable factor includes a significant increase of SNR.

Figure 7:
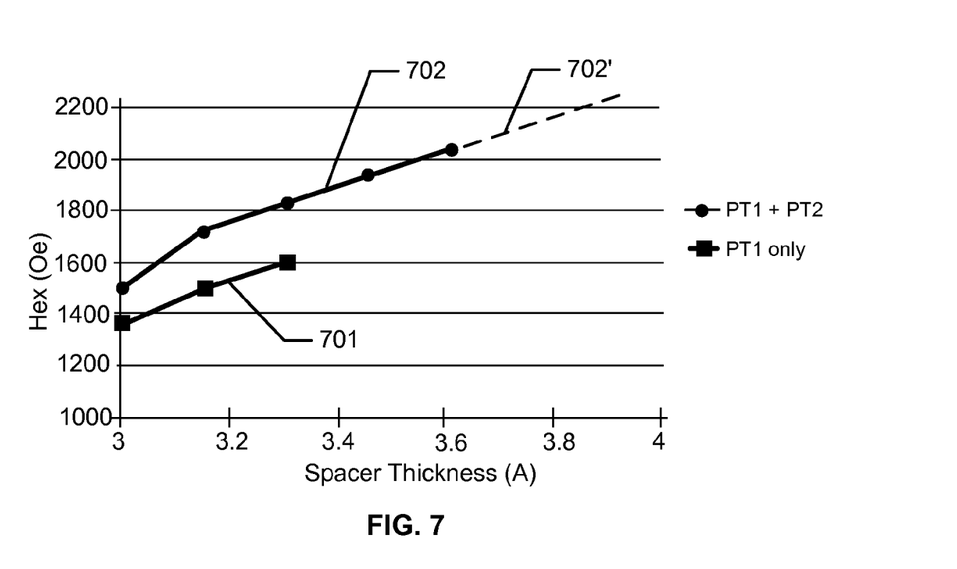
FIG. 7 is a graph showing performance characteristics of a recording transducer in accordance with one embodiment of the invention.

FIG. 7 is a chart that illustrates the performance of a read sensor fabricated according to embodiments of the invention. The y-axis in FIG. 7 is the pinning strength $H_{ex}$ of the AFM layer measured in Oersteads (Oe). The x-axis is the thickness of the spacer layer above the magnetic seed layer measured in Angstroms.

The first response curve 701 represents the transfer function of a read sensor similar to that described in FIG. 3, and including a first plasma treatment on the bottom shield similar to that described in first plasma treatment 420A in FIG. 4; and also including an amorphous FM layer similar to the amorphous FM layer 432 in FIG. 4. Response curve 701 does not; however, include a second plasma treatment on the amorphous FM layer.

The second response curve 702 represents the transfer function of a read sensor according to one embodiment of the invention. Second response curve 702 illustrates the response of a read sensor similar to that described in FIG. 3 and FIG. 4, and including the first plasma treatment 420A and the second plasma treatment 432A and fabricated using process 500 as described in FIG. 5.

It can be seen that in response curve 701 that spacer layer is very sensitive to thickness and becomes unstable above a thickness of about 3.5 Angstroms, where the response curve ends. The thickness of the spacer layer also significantly affects the $H_{ex}$, and therefore becomes a factor in how small, or thin, the sensor stack can be fabricated between the top shield and the bottom shield. This narrow useful range is also harder to fabricate.

In response curve 702, the curve is shifted upward from response curve 701, representing the improved $H_{ex}$ that results from the improved AFM layer, which in turn resulted from the process treatments previously described in FIG. 4. Additionally, it can be seen from response curve 702 that the spacer layer may be fabricated substantially thicker that was previously possible, while remaining stable. The thickness of the spacer layer may now be extended from a thickness below about 3.4 Angstroms, to a thickness of at least 3.6 angstroms. This extended usable range also has the effect of increasing process margin. Thicknesses between about 3.6 and 4.0 Angstroms shown as dotted response curve 702' are also stable under some conditions; for example, depending on the thickness of the AFM layer.

The description of the invention is provided to enable any person ordinarily skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those ordinarily skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method for providing a magnetic recording transducer having a magnetic seed layer comprising:
   providing a substrate;
   providing a magnetic shield having a first top surface above the substrate;
   treating the first top surface by a first plasma treatment performed at a first power;
   depositing an amorphous ferromagnetic (FM) layer on and in contact with the first top surface, the amorphous FM layer deposited to a thickness of at least 5 Angstroms and not more than 50 Angstroms;
   reducing the thickness of the amorphous FM layer by a second plasma treatment performed at a second power;
   providing a magnetic seed sublayer on and in contact with the amorphous FM layer, the magnetic seed layer including the amorphous FM layer and the magnetic seed sublayer;
   providing a nonmagnetic spacer layer above the magnetic seed sublayer;
   providing an antiferromagnetic (AFM) layer above the spacer layer; and
   providing a plurality of layers including a pinned layer, a reference layer, a barrier layer and a free layer of a read sensor above the AFM layer.

2. The method of claim 1 wherein the first power is from about 30 Watts to about 100 Watts.

3. The method of claim 1 wherein the second power is from about 30 Watts to about 50 Watts.

4. The method of claim 1 wherein the second plasma treatment reduces the thickness of the amorphous FM layer to a thickness of at least 5 Angstroms and not more than 20 Angstroms.

5. The method of claim 1 wherein the nonmagnetic spacer layer is deposited to a final thickness of at least 2.0 Angstroms and not more than 4.0 Angstroms prior to depositing the AFM layer.

6. The method of claim 1 wherein the second plasma treatment reduces the thickness of the amorphous FM layer to a thickness of at least 5 Angstroms and not more than 20 Angstroms, and the nonmagnetic spacer is deposited to a final thickness of at least 2.0 Angstroms and not more than 4.0 Angstroms.

7. The method of claim 6 wherein the nonmagnetic spacer is deposited to a final thickness of at least 3.4 Angstroms and not more than 4.0 Angstroms.

8. The method of claim 1 wherein the amorphous FM layer comprises at least one of CoFeB, NiCoFeB, and NiFeB, wherein B comprises from about 18 atomic percent (at. %) to about 22 at. %.

9. The method of claim 1 wherein the magnetic seed sublayer is a bilayer including a first sub layer, the first sub layer on and in contact with the amorphous FM layer, and a second sub layer that is on and in contact with the first sub layer, wherein:
   the first sub layer comprises $Ni_{1-x}Fe_x$, where x is at least 0.45 and not more than 0.55 and the second sub layer comprises $Ni_{1-y}Fe_y$, where y is at least 0.05 and not more than 0.15.

10. The method of claim 1 wherein the nonmagnetic spacer layer comprises at least one of Ru, Ti, and Ta.

* * * * *